United States Patent [19]

Rice

[11] Patent Number: 4,914,850
[45] Date of Patent: Apr. 10, 1990

[54] FISHING LURE
[76] Inventor: Mont Rice, Rte. 7, Box 340A, Greeneville, Tenn. 37743
[21] Appl. No.: 311,109
[22] Filed: Feb. 15, 1989
[51] Int. Cl.$^4$ ............................................. A01K 85/00
[52] U.S. Cl. .................................................. 43/42.24
[58] Field of Search .................. 43/42.1, 42.24, 42.39, 43/42.28, 42.29

[56] References Cited
U.S. PATENT DOCUMENTS

| 1,267,627 | 5/1918 | Campbell . | |
| 2,290,433 | 7/1942 | Jeffers | 43/42 |
| 2,503,672 | 4/1950 | Johnson et al. | 43/42.24 |
| 3,120,074 | 2/1964 | Messler | 43/42.28 |
| 4,214,396 | 7/1980 | Firmin | 43/42.1 |
| 4,219,956 | 9/1980 | Hedman | 43/42.1 |
| 4,312,148 | 1/1982 | Hardwicke, III | 43/42 |
| 4,592,161 | 6/1986 | Smith et al. | 43/42.24 |
| 4,653,212 | 3/1987 | Pixton | 43/4.5 |
| 4,709,501 | 12/1987 | Garst | 43/42.24 |

Primary Examiner—M. Jordan
Attorney, Agent, or Firm—Luedeka, Hodges & Neely

[57] ABSTRACT

A fishing lure having a lure body which is soft and flexible for use with various hook carrying rigs. The body is elongated and includes a head portion and a tail portion. The head portion is generally cylindrical and the tail portion semi-cylindrical with a generally flat lower surface, the transition between the head and tail portion defining a generally straight line which extends transversely over the flat surface of the tail portion.

8 Claims, 2 Drawing Sheets

FISHING LURE

The present invention relates to fishing lures and more particularly to a soft highly flexible lure body which can be used with various hook carrying rigs such as jigs, spoons, spinners or the like.

Plastic worms, grubs, hellgrammites, crabs and the like have become popular artificial fishing lures when used with hook carrying rigs of various types. The plastic lures are highly plasticized so that they are extremely flexible and are made available in a wide array of colors. The fish catching ability of lures of this type is dependent to a great extent upon the action that can be imparted to the lure by passage through the water and by "working" the lure through changes in speed and movement caused by contact with the bottom of the waterway being fished and the like. Heretofore, plastic lures of the class described have been fabricated to resemble the live bait which they simulate so that the action of the lure is not necessarily the optimum for catching fish.

It is the object of this invention to provide a lure of soft, highly flexible plastic which can be used with a hook rig and which provides an enhanced action which results in greater fishing success.

Other objects and advantages of the invention will become known by reference to the following description and the accompanying drawings in which.

Figure 1:
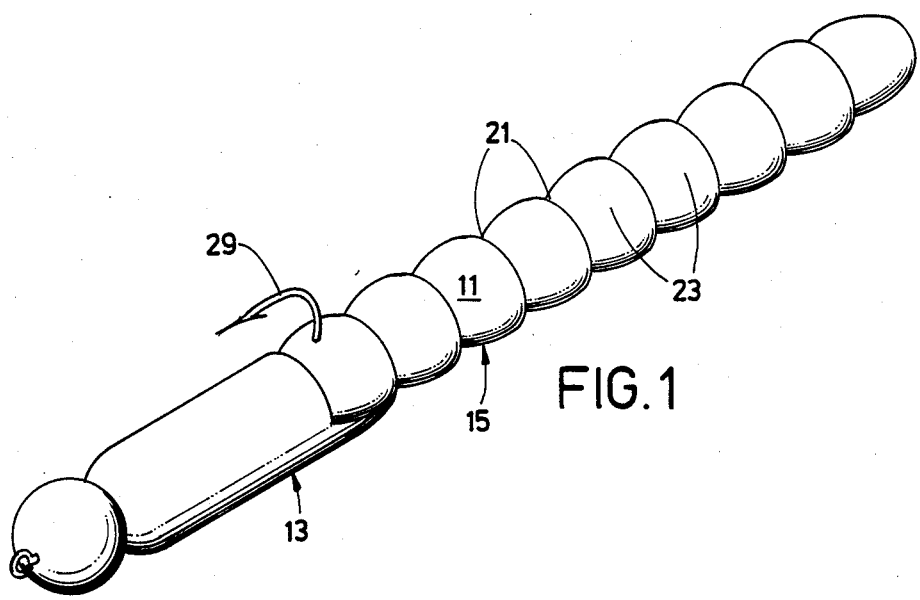
FIG. 1 is a perspective view of one embodiment of the invention attached to a lead head jig.

A lure body in accordance with the invention is molded or otherwise formed from a soft, highly resilient and flexible polymeric material having the same general characteristics as the plastics or polymers employed in making plastic worms and like lures. For example, highly plasticized polyvinyl chloride may be used as may be other suitable plastics having similar physical properties.

Now referring to FIGS. 1-5, the lure body 11 includes a head 13, and a tail 15. The head 13 is generally cylindrical in cross section (see FIG. 4) and has a forward end 17 which is preferably rounded as illustrated. The tail 15 extends from the rearward end of head 13 and is provided with a flat bottom surface 19. The tail 15 is generally semicircular in cross section (see FIG. 5) and is formed with a series of transverse indentations 21 which extend across the curved section of the tail. The indentations 21 are adapted to increase the flexibility of the tail of the lure body.

In the embodiment shown in FIGS. 1-5, the indentations 21 are formed by the intersection of a series of longitudinally arranged transversely extending arcuate surfaces 23 which also provide an articulated appearance to the tail 15.

The junction 25 of the head 13 and the tail 15 is also of importance in obtaining the desired action for the lure. As illustrated, the tail 15 generally provides an extension of the top portion of the cylindrical head 13. The junction 25 between the tail should preferably lie along a generally straight line 25a and the transition surface 27 which is generated by the transition between the generally semicircular cross section of the tail 15 and the generally circular cross section of the head 13 should preferably lie at an angle A (FIG. 2) of between about 0° and 50°. This results in a rapid change in the cross sectional area adjacent the junction 25. Most preferably, the angle A should be between about 40° and 50° to prevent unwanted eddies when the lure is rapidly retrieved and to provide the desired change in cross-sectional area referred to above.

The rapid change in cross section which occurs adjacent the junction 25 causes movement of the head 13 to effect a whipping action adjacent and rearwardly of the junction 25 which results in a magnified movement of the tail with respect to movement of the head.

Figure 2:
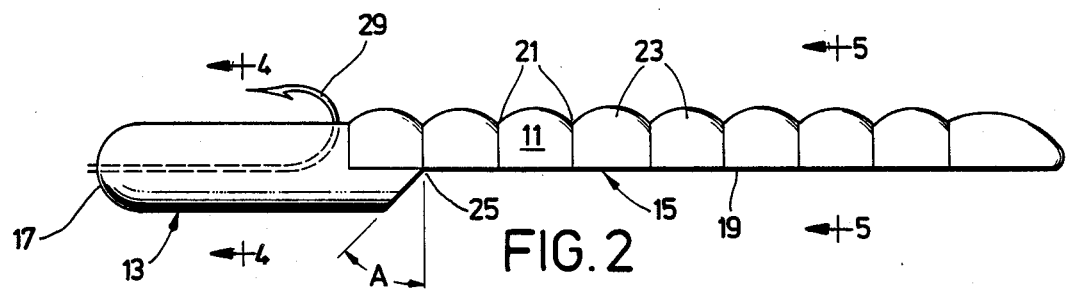
FIG. 2 is a side elevational view of the embodiment show in FIG. 1.
Figure 3:
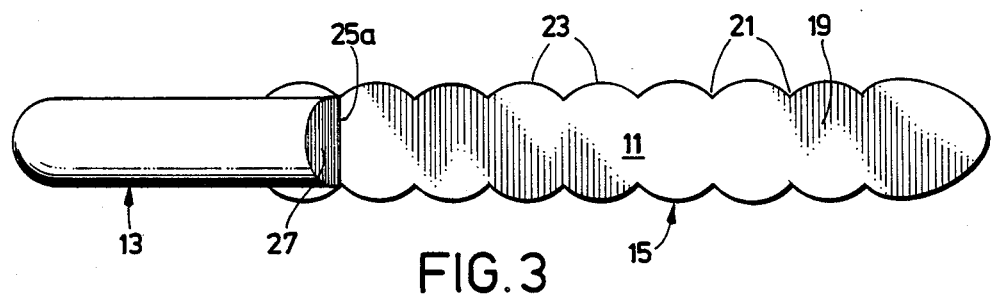
FIG. 3 is a bottom view of the embodiment shown in FIG. 2.
Figure 4:
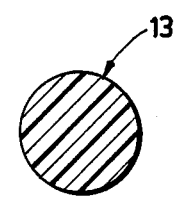
FIG. 4 is a sectional view taken on line 4—4 in FIG. 2.
Figure 5:
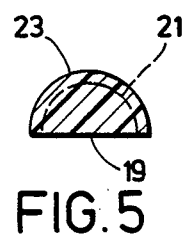
FIG. 5 is a sectional view taken on line 5—5 in FIG. 2.

The action referred to above can be further enhanced if one of the indentations 21 lies in a plane closely adjacent to the junction 25 as shown in FIG. 2 since indentation further reduces the cross sectional area adjacent that point.

In use, the hook 29 (shown in dotted outline in FIG. 2) and which may be part of a lead head jig, spoon, spinner or the like is inserted in the head 13. This is accomplished by piercing the forward surface 17 of the head 13 with the barb of the hook 29 and working the head around the hook until a sufficient portion of the head 13 lies along the shank of the hook. When the desired position is reached, the barb can be brought out through the surface of the head with the shank of the hook running through the central portion of the head 13.

A lure, as described above, may be fabricated in various sizes and proportions. However, a satisfactory size for large mouth bass fishing is about 3" in length, the distance between the front of the head 13 and the transition line 25a is ⅞", and the tail 15 extends 2⅛" from the transition line, the diameter of the head is about 5/32", the indentations 21 are spaced about ¼" apart, the arcuate surfaces 25 have a radius of about ¼", and the transition surface 27 has an angle A of 45°.

In use, it has been found that the lure when worked, provides a unique action which is believed to result from the combination of the indented tail, the flat tail bottom and the transition between the tail and larger cross section head with the large difference in cross sectional area.

Figure 6:
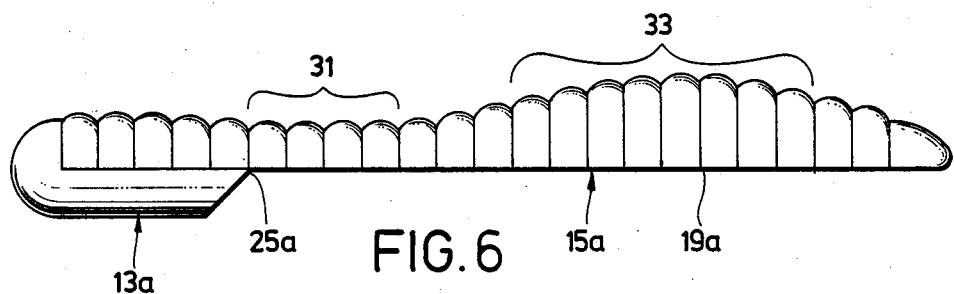
FIG. 6 is a side elevational view of another embodiment of the invention.

The lure can take other configurations. For example, as shown in FIG. 6, the indentations 21a and the arcuate surfaces 23a are continued along the head 13a of the lure. In addition, to change the action, the cross sectional area of the tail section is reduced in the area 31 and increased in the area 33. This provides differences in resistance to bending along the length of the tail with a greater flexibility adjacent the junction 25a' and lesser flexibility in the central portion of the tail. This causes a different action when the rod is twitched or when the lure is retrieved in short increments.

Figure 7:
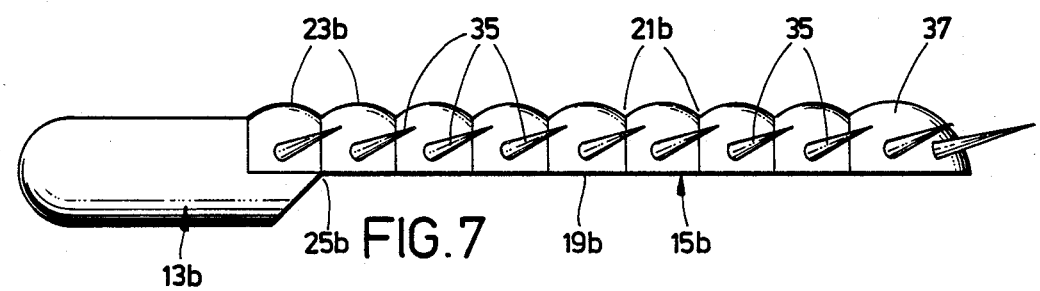
FIGS. 7, 8 and 9 are side elevational, bottom, and plan views, respectively, of still another embodiment of the invention.
Figure 8:
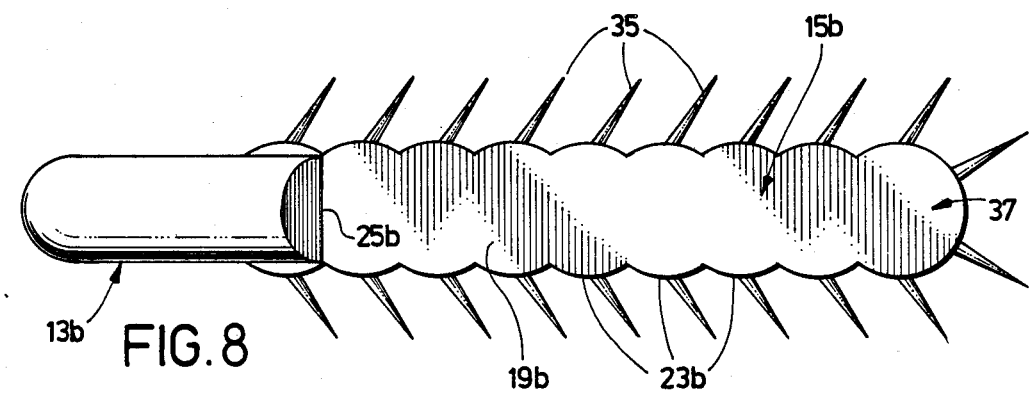
Figure 9:
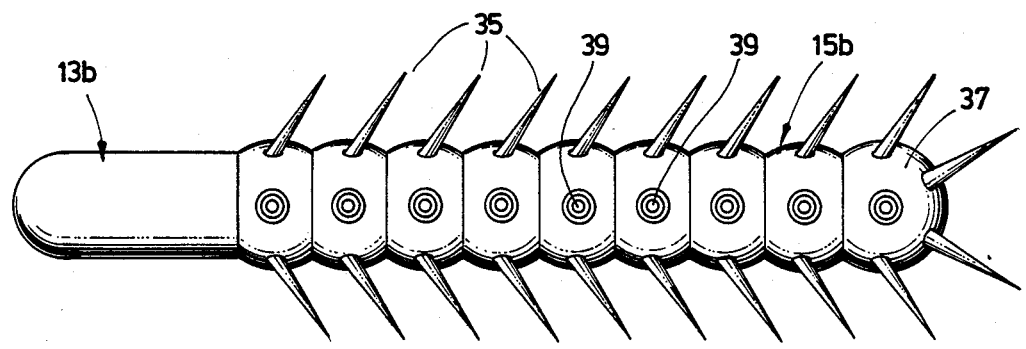

FIGS. 7-9 show an embodiment of the invention which has been embellished with simulated legs and designs. Again, the embodiment include the generally cylindrical head 13b, the tail 15b having a flat lower surface 19b, the transverse indentations 21b and the transition from the head to the tail along a straight line 25c. In addition, simulated legs 35 are molded into each side of each of the arcuate surfaces 23b and into the trailing surfaces 37 of the tail 15b. The legs 35 are tapered from their base to their tip and are preferably located slightly above the bottom surface 19b of the tail 15b. Also, multileveled circular patterns 39 may be molded into the top of each of the arcuate surfaces 23b. It has been found that the leg action which occurs as a result of the flexibility and action of the lure enhance the attractiveness of the lure to fish under certain conditions.

Various features of the invention which are believed to be new are set forth in the appended claims.

What is claimed is:

1. A fishing lure body adapted to be rigged on a hook comprising:

an elongated body of soft, flexible, polymeric material including a head portion at one end and a tail portion at the other end;

the head portion being generally cylindrical in shape and the tail portion having a cross-section which is generally semi-cylindrical to provide a curved upper surface and a flat lower surface.

the transition between the head and tail portions defining a generally straight line which extends transversely over the flat surface of said tail portion; and the cross-section of said head section forward of said line being substantially greater than the cross-section of said tail portion.

2. The lure body of claim 1 wherein the transition from said generally straight line is defined by a plane which extends across the head portion at an angle of from 0°–50° with the axis of the lure.

3. The lure claim 2 wherein the angle is from about 40°–50°.

4. The lure body of claim 2 wherein spaced apart indentations are provided along the length of the tail portion, said indentations extending transversely across the curved upper surface of the tail portion.

5. The lure body of claim 4 wherein the indentations are formed by the intersection of spaced, transversely extending arcuate surfaces on the curved upper surface of the tail portion.

6. The lure of claim 4 wherein one of the indentations in the tail portion is positioned adjacent the transition line between the head and tail portions.

7. The lure body of claim 5 wherein the cross-sectional area of the tail portion adjacent the transition line is less than the cross-sectional area of the tail portion remote from the transition line.

8. The lure body of claim 5 wherein tapered legs extend from the sides of the transverse arcuate surfaces.

* * * * *

UNITED STATES PATENT AND TRADEMARK OFFICE
CERTIFICATE OF CORRECTION

PATENT NO. : 4,914,850

DATED : April 10, 1990

INVENTOR(S) : Mont Rice

It is certified that error appears in the above-identified patent and that said Letters Patent is hereby corrected as shown below:

Column 1, line 33, "show" should be -- shown --.

Column 4, line 8, after lure insert -- body of --.

Signed and Sealed this

Second Day of July, 1991

Attest:

HARRY F. MANBECK, JR.

*Attesting Officer*  *Commissioner of Patents and Trademarks*